(12) United States Patent
Tsai

(10) Patent No.: US 6,683,270 B2
(45) Date of Patent: Jan. 27, 2004

(54) TOOL HOLDER FOR AN ELECTRIC DISCHARGE MACHINE

(76) Inventor: Tian-Shosi Tsai, No. 119, Kung-Yuan 2nd Rd., Yen-Cheng Dist., Kaohsiung (TW)

( * ) Notice: Subject to any disclaimer, the term of this patent is extended or adjusted under 35 U.S.C. 154(b) by 9 days.

(21) Appl. No.: 10/159,504

(22) Filed: May 31, 2002

(65) Prior Publication Data

US 2003/0222053 A1 Dec. 4, 2003

(51) Int. Cl.[7] ............................................. B23H 7/26
(52) U.S. Cl. ................................................. 219/69.15
(58) Field of Search ..................... 219/69.11, 69.18; 204/297.01, 224 M; 408/231, 239 R (56) References Cited

U.S. PATENT DOCUMENTS

| | | | | |
|---|---|---|---|---|
| 3,614,370 A | * | 10/1971 | Italo | ........................ 219/69.15 |
| 3,727,023 A | * | 4/1973 | Monnich | .................. 219/69.15 |
| 3,741,573 A | * | 6/1973 | Treer | ........................ 219/69.15 |
| 5,593,258 A | * | 1/1997 | Matsumoto et al. | .... 408/239 R |

* cited by examiner

*Primary Examiner*—Geoffrey S. Evans (57) ABSTRACT

A tool holder for an electric discharge machine has a top base, a securing collar, a positioning sleeve, an adjusting base and a rotating base. The top base has a central hole and an elongated opening communicating with the central hole. The securing collar is screwed into the central hole in the top base and has a central hole with a conical inner surface. The securing collar has multiple holes corresponding to the elongated opening in the top base. A positioning sleeve has a conical outer surface fitting with the conical inner surface in the securing collar. The adjusting base has a main shaft penetrating through the central hole in the positioning sleeve. Consequently, the locked condition of the main shaft is released by rotating the securing collar, such that the adjustment of the tool holder is convenient.

12 Claims, 7 Drawing Sheets

TOOL HOLDER FOR AN ELECTRIC DISCHARGE MACHINE

BACKGROUND OF THE INVENTION

1. Field of the Invention

The present invention relates to a tool holder, and more particularly to a tool holder for an electric discharge machine and that can be rotated in a vertical axle.

2. Description of Related Art

Figure 10:
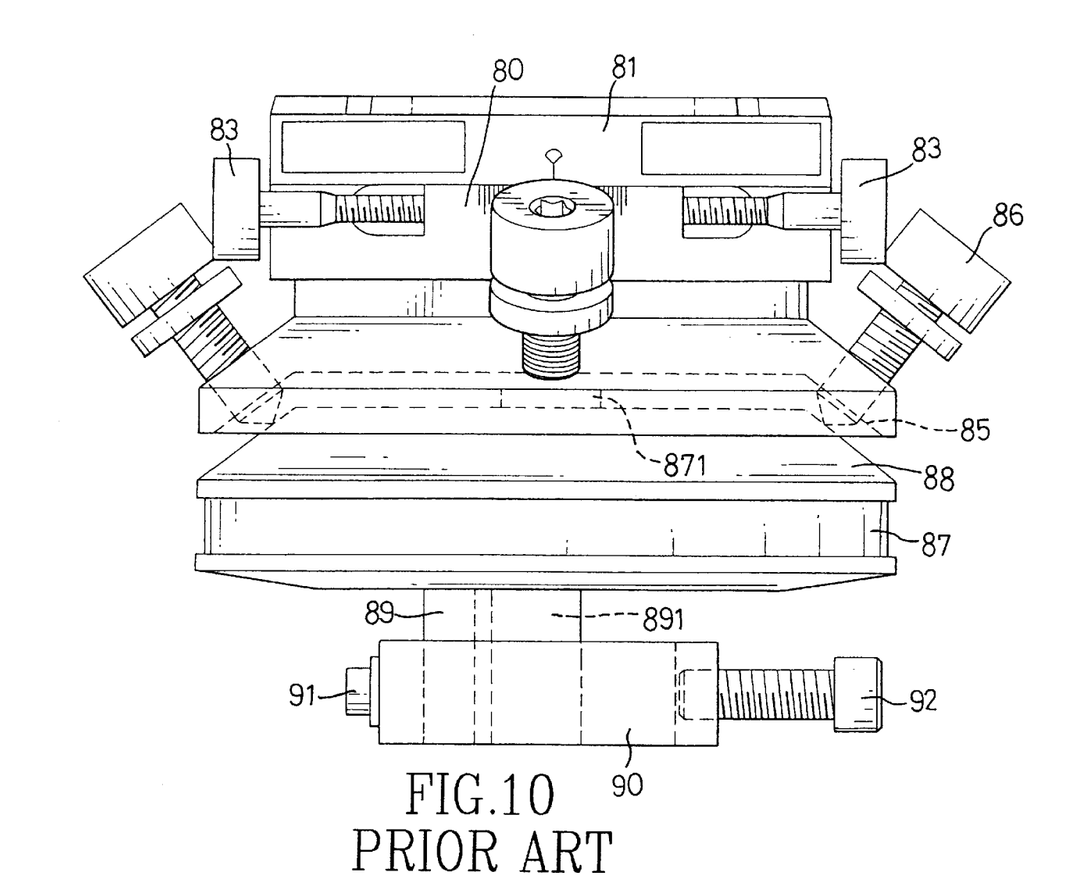
FIG. 10 is a side plan view of a conventional tool holder of an electric discharge machine in accordance with the prior art.

With reference to FIG. 10, a conventional tool holder for an electric discharge machine (EDM) in accordance with the prior art comprises a body (80), a top base (81), a conical base (87), an electrode base (89) and an electrode collar (90). The body (80) is rotatably attached to the top base (81). Multiple adjusting screws (83) are screwed into the body (80) to adjust the body (80) relative to the top base (81) in a limited range. A conical cavity (85) is defined in the bottom of the body (80). The conical base (87) is rotatably attached to the bottom of the body (80) with a main shaft (871). A conical surface (88) is formed on the top of the conical base (87) and received in the conical cavity (85). Multiple horizontal adjusting screws (86) are inclinedly screwed into the body (80) and each has a free end abutting the conical surface (88) of the conical base (87). When the horizontal adjusting screws (86) are rotated, the conical base (87) will be pushed to rotate relative to the body (80) so as to adjust the horizontal level of the conical base (87). The electrode base (89) is securely attached to the bottom of the conical base (87) and has a notch (891) defined in one side of the electrode base (89). The electrode base (89) is connected to the positive electrode of the electric discharging device of the EDM. The electrode collar (90) is securely attached to the electrode base (89) with securing bolts (91,92). One of the securing bolts (92) faces and extends into the notch (891) in the electrode base (89). Consequently, a tool can be securely attached the notch (891) in the electrode base (89) by the electrode collar (90) and the securing bolt (92).

When the electric discharge machine is in operation, the positive electrode of the electric discharge device is connected to the tool through the electrode base (89) and the negative electrode of the electric discharge device is connected to a workpiece. When the tool approaches the work, the electric power will be discharged from the tool to the workpiece so as to erode the workpiece to form a hole, a recess or a cavity or the like therein.

However, although the body (80) can rotate relative to the top base (81) to adjusting the working position of the tool, the rotating range of the body (80) relative to the top base (81) is very small. The tool attached to the conventional tool holder cannot be moved in a large range. For example, if the work will be formed with two holes at the opposite ends of a diameter of a circle, the tool holder must be released, rotated and locked to align with a position for forming another hole after one hole has been formed. The horizontal level of the body (80), the conical base (87) and the tool must be readjusted. To form the work in a large range with the conventional tool holder is inconvenient.

To overcome the shortcomings, the present invention tends to provide a tool holder to mitigate or obviate the aforementioned problems.

SUMMARY OF THE INVENTION

The main objective of the invention is to provide a tool holder for an electric discharge machine and that can be adjusted conveniently. The tool holder has a top base, a securing collar, a positioning sleeve, an adjusting base, a rotating base, a conical base, an electrode base and an electrode collar. The top base is secured to a base of the electric discharge machine and has a central hole and an elongated opening communicating with the central hole. The securing collar is screwed into the central hole in the top base and has a central hole with a conical inner surface. Multiple holes are defined around the securing collar and correspond to the elongated opening in the top base. A positioning sleeve is received in the central hole of the securing collar and has a conical outer surface fitting with the conical inner surface in the securing collar. The adjusting base is rotatably attached to the bottom of the top base and has a main shaft penetrating through the central hole in the positioning sleeve and into the central hole in the top base. The rotating base is adjustably connected to the bottom of the middle base and for the conical base, electrode base and the electrode collar being connected to the bottom of the rotating base. In such an arrangement, the locked condition of the main shaft is released by means of the rotating the securing collar, such that the adjusting base with the rotating base can be rotated relative to the top base. Consequently, a tool attached to the electrode base can be moved to a position at a circle conveniently.

Other objects, advantages and novel features of the invention will become more apparent from the following detailed description when taken in conjunction with the accompanying drawings.

DETAILED DESCRIPTION OF PREFERRED EMBODIMENT

Figure 1:
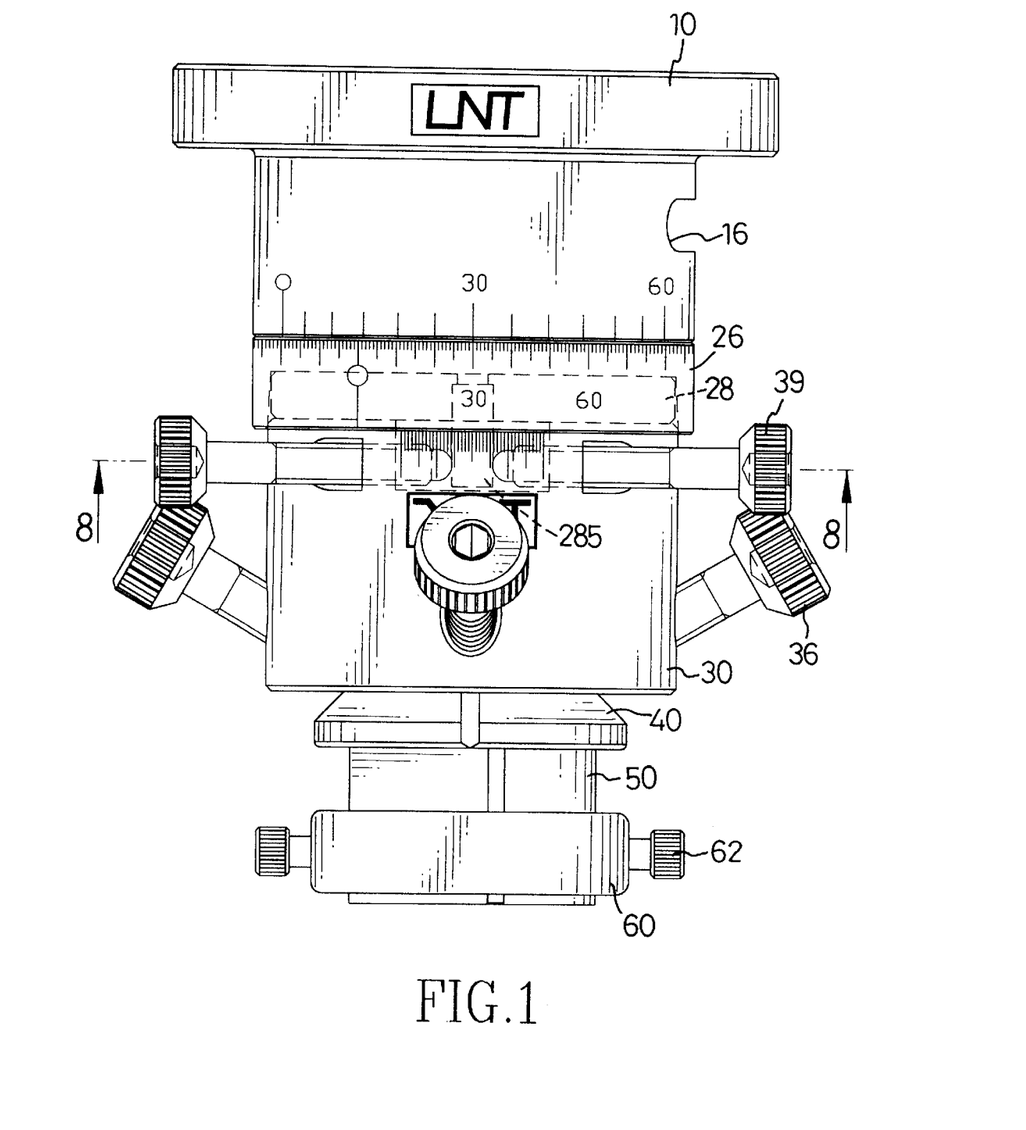
FIG. 1 is a side plan view of a tool holder of an electric discharge machine in accordance with the present invention.
Figure 2:
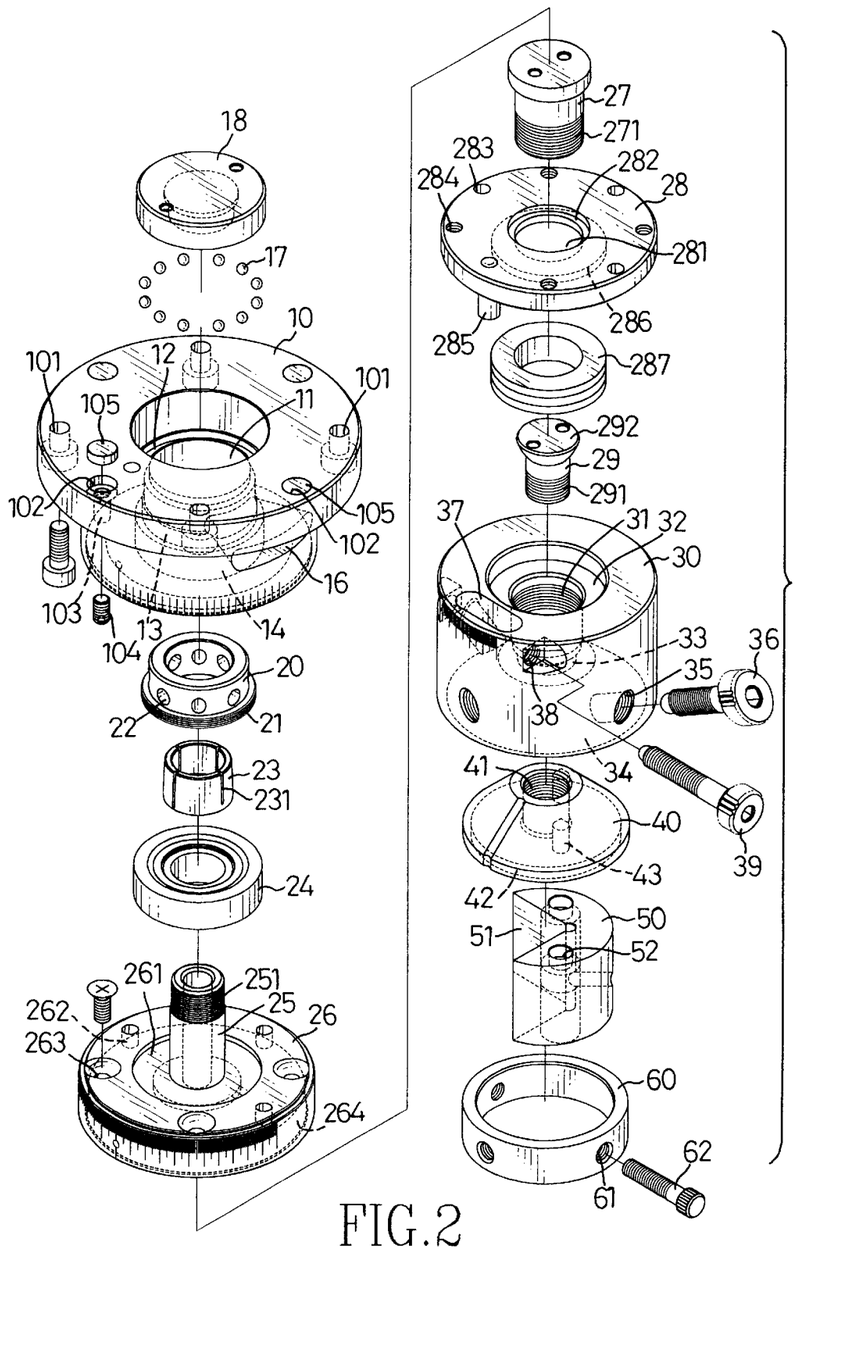
FIG. 2 is an exploded perspective view of the tool holder in FIG. 1.
Figure 3:
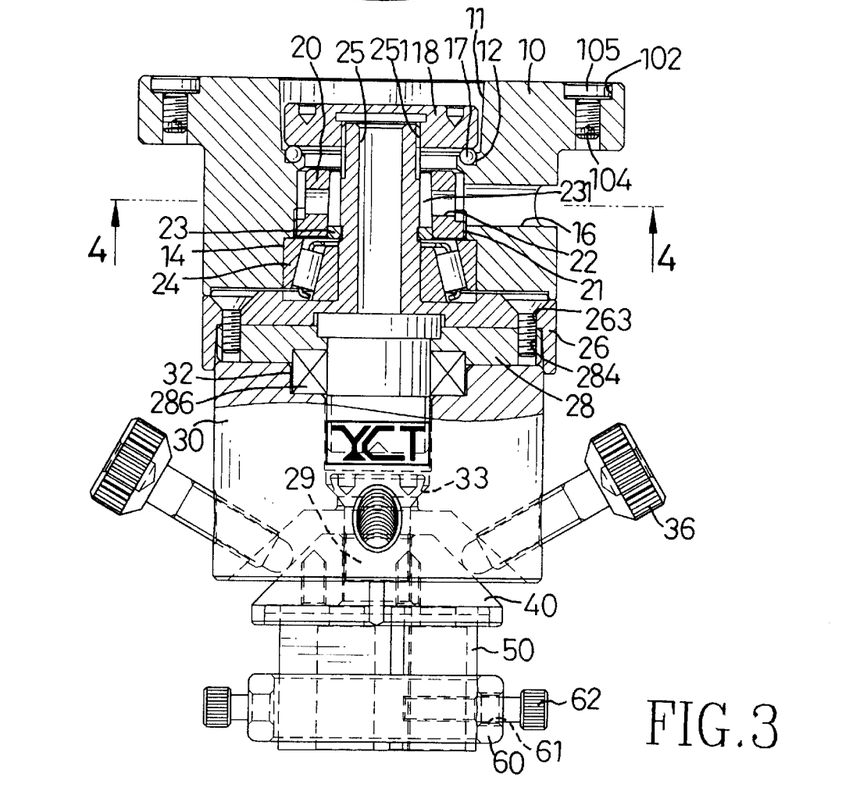
FIG. 3 is a side plan view in partial cross section of the tool holder in FIG. 1
Figure 4:
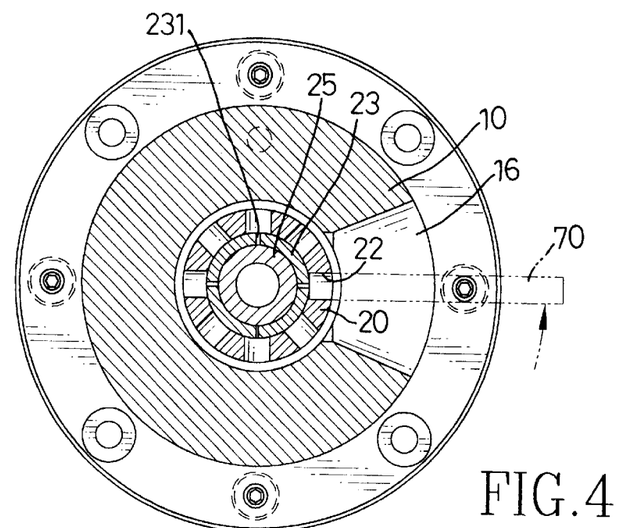
FIG. 4 is a bottom plan view in partial section of the tool holder along a cross line 4—4 in FIG. 3.
Figure 5:
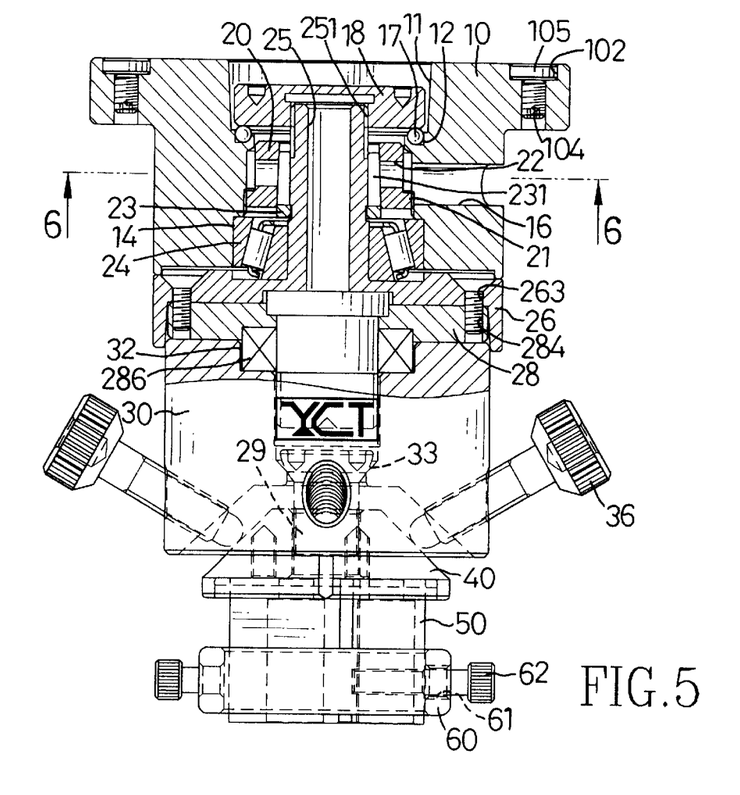
FIG. 5 is an operational side plan view in partial cross section of the tool holder in FIG. 1 showing that the positioning sleeve is released.
Figure 6:
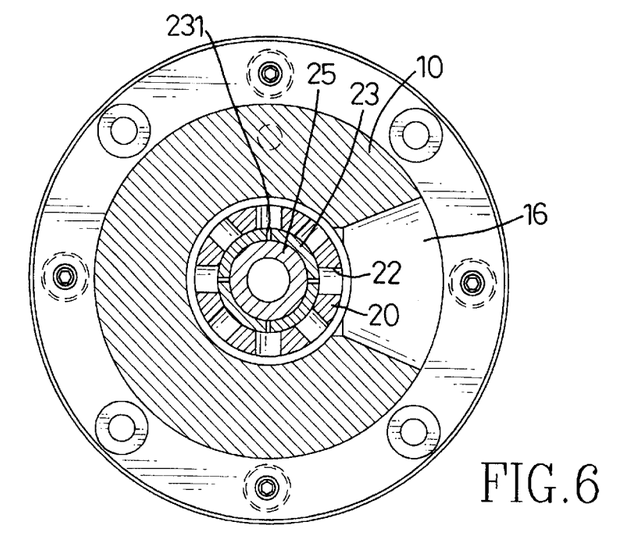
FIG. 6 is an operational bottom plan view in partial section of the tool holder along a cross line 6—6 in FIG. 5.
Figure 7:
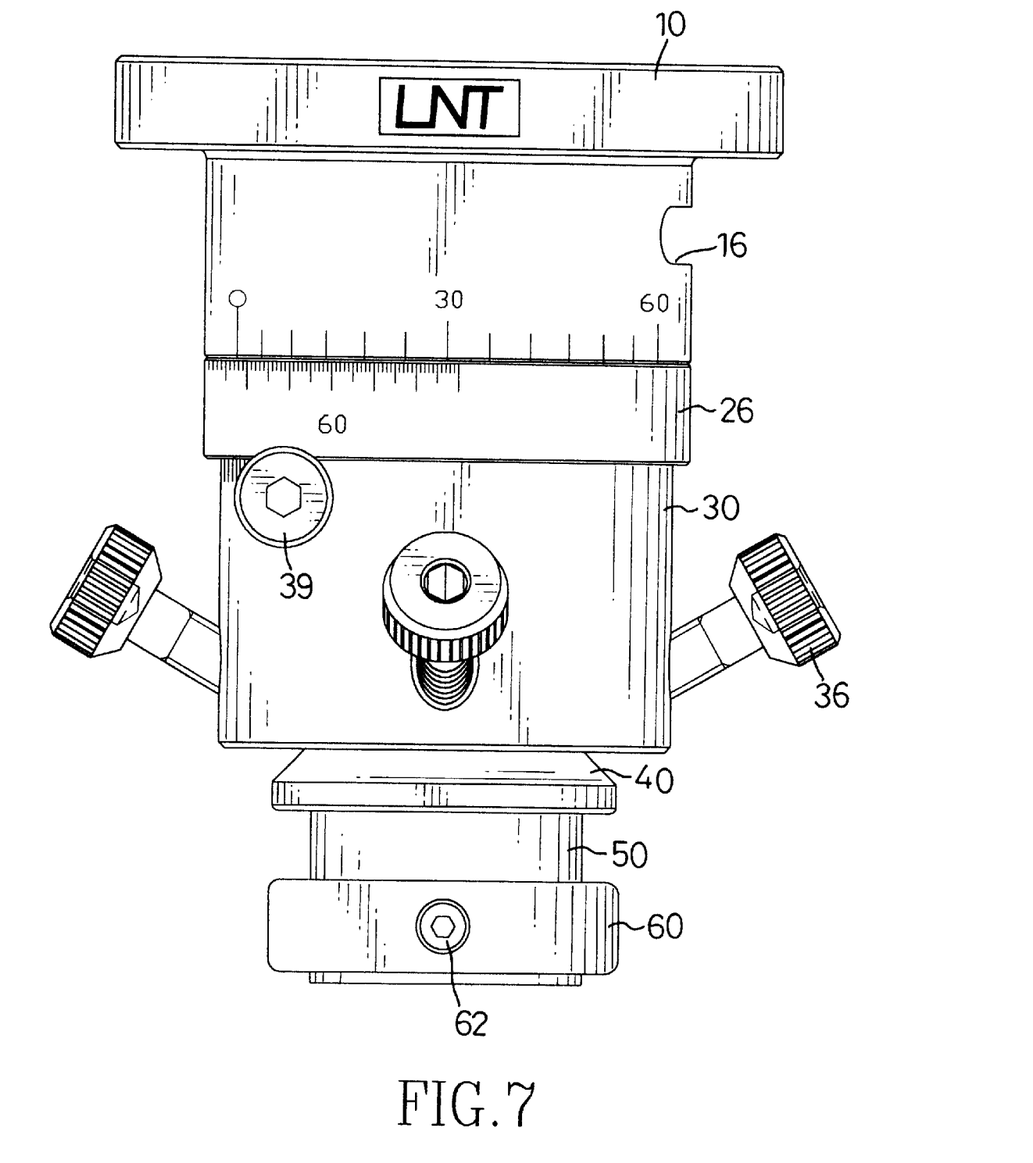
FIG. 7 is an operational side plan view of the tool holder in FIG. 1 showing that the rotating base is rotated relative to the top base.

With reference to FIGS. 1 to 3, a tool holder of an electric discharge machine (EDM) in accordance with the present invention comprises a top base (10), an adjusting base (26), a rotating base (30), a conical base (40), an electrode base (50) and an electrode collar (60). The top base (10) is secured to the base of the electric discharge machine. A central hole (11) is defined through the top base (10). An inner thread (13) is defined in the bottom of the central hole (11). A flange (not numbered) is radially formed on the inner surface of the central hole (11), such that a shoulder (12) is formed on the top of the flange. A recess (14) is defined in a bottom of the top base (10) and communicates with the central hole (11) to receive the top of a bearing (24). An elongated opening (16) is laterally defined in the periphery of the top base (10) and communicates with the central hole (11).

Multiple first through holes (101) are defined through the top base (10) and are arranged in a circle at a center point of the central hole (11). A screw (not numbered) penetrates through each respective first through hole (101) and screws into a threaded hole (not shown) in the base of the electric discharge machine so as to secure the top base (10) to the base of the electric discharge machine. Multiple second thread holes (102) with inner threads (103) are defined through the top base (10) and are arranged in a circle at a center point of the central hole (11). A pad (105) is received in each respective second through hole (102), and a pushing screw (104) is screwed into the inner thread (103) of each respective second through hole (102) and has a top end abutting the corresponding pad (105). When the pushing screw (104) is rotated, the pushing screw (104) will move upward or downward along the second through hole (102). Consequently, the pad (105) will be pushed to expose from the top of the top base (10) to abut against the base of the electric discharge machine or will retract into the second through hole (102), such that the horizontal level of the top base (10) relative to the electric discharge machine is adjusted.

A securing collar (20) is received in the central hole (11) of the top base (10) and has a thread (21) formed on the periphery of the bottom of the securing collar (20) to screw with the inner thread (13) in the central hole (11) of the top base (10). A central hole (not numbered) is defined through the securing collar (20) and has a conical inner surface. Multiple holes (22) are defined around the periphery of the securing collar (20) and correspond to the elongated opening (16) in the top base (10).

A positioning sleeve (23) is received in the central hole of the securing collar (20) and has a conical outer surface fitting with the conical inner surface of the central hole in the securing collar (20). A central hole (not numbered) is defined through the positioning sleeve (23) and has a constant diameter. At least one slit (231) is longitudinally defined in the positioning sleeve (23) so as to provide a resiliency to the positioning sleeve (23).

The adjusting base (26) is rotatably attached to the bottom of the top base (10). A main shaft (25) extends upward from the top of the adjusting base (26) and penetrates through the bearing (24), the central hole in the positioning sleeve (23) and into the central hole (11) in the top base (10). A thread (251) is formed on the periphery of the top of the main shaft (25) to screw with an inner thread defined in a cap (18) received in the top of the central hole (11) in the top base (10). Multiple balls (17) are mounted on the shoulder (12) and support the cap (18) to serve as a ball bearing to the cap (18), such that the main shaft (25) can freely rotate relative to the top base (10). A top recess (261) is defined in the top of the adjusting base (26) and around the main shaft (25) to receive a bottom of the bearing (24). A bottom recess (264) is defined in the bottom of the adjusting base (26), and multiple through holes (263) are defined in the adjusting base (26) and communicate with the bottom recess (264). At least one positioning stub (262) extends downward from a face defining the bottom recess (264).

A middle base (28) is secured to the bottom of the adjusting base (26) and received in the bottom recess (264) in the adjusting base (26). Multiple threaded holes (284) are defined in the middle base (28) and align with the through holes (263) in the adjusting base (26). A screw (not numbered) extends through each respective through hole (263) in the adjusting base (26) and is screwed into the corresponding threaded hole (284) in the middle base (28) so as to secure the middle base (28) to the adjusting base (26). A bore (283) is defined the middle base (28) and corresponds to each respective positioning stub (262) for the corresponding positioning stub (262) extending into the bore (283).

A central hole (281) is defined through the middle base (28) for a rocking shaft (27) penetrating through the central hole (281). A top recess (282) is defined in the top of the middle base (28) and is around the central hole (281) to receive the head of the rocking shaft (27). A bottom recess (286) is defined in the bottom of the middle base (28) and surrounds the central hole (281) to receive a top of a bearing (287). The rocking shaft (27) extends through the bearing (287), such that the rocking shaft (27) can freely rotate relative to the middle base (28). A positioning post (285) extends downward from the bottom of the middle base (28).

Figure 8:
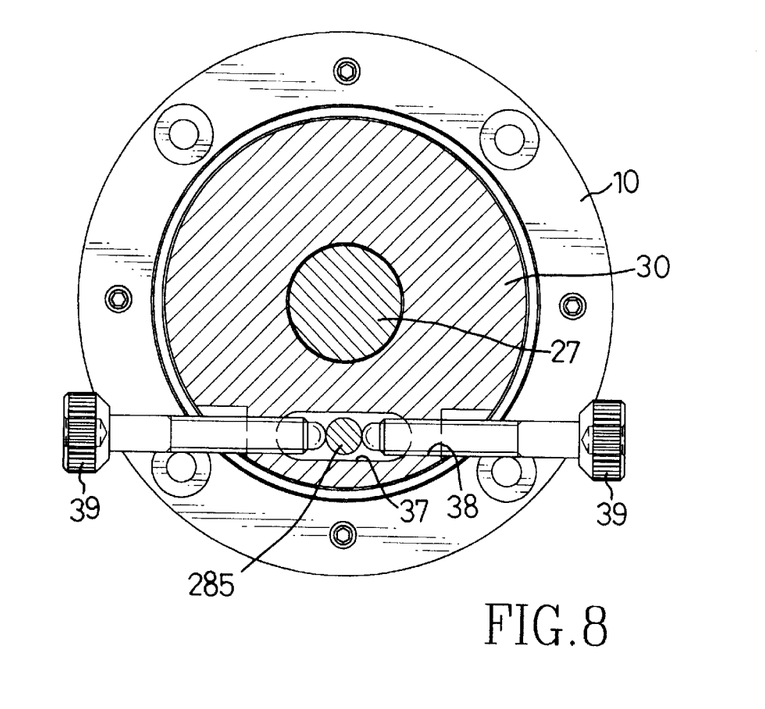
FIG. 8 is a bottom plan view in partial section of the tool holder along a cross line 8—8 in FIG. 1.

The rotating base (30) is adjustably attached to the bottom of the middle base (28). A central hole (31) is defined in the rotating base (30). An inner threaded portion (not numbered) is defined in the inner surface of the central hole (31) in the rotating base (30). A thread (271) is formed on the bottom of the rocking shaft (27) to screw with the inner threaded portion in the rotating base (30). A recess (32) is defined in the top of the rotating base (30) and surrounds the central hole (31) to receive the bottom of the bearing (287). A slot (37) is defined in the top of the rotating base (30), and the positioning post (285) on the middle base (28) extends into the slot (37). Two horizontal threaded holes (38) are laterally defined in the rotating base (30) respectively at two sides of the slot (37) and communicate with the slot (37). Two adjusting screws (39) are respectively screwed into the horizontal threaded holes (38) and each has a free end abutting one side of the positioning post (285) extending into the slot (37) as shown in FIG. 8, such that the middle base (28) can be adjustably connected to the rotating base (30).

A conical cavity (34) is defined in the bottom of the rotating base (30) and communicates with the central hole (31) in the rotating base (30). A neck (33) with a diameter smaller than that of the central hole (31) in the rotating base (30) is defined between the central hole (31) and the conical cavity (34). Multiple inclined threaded holes (35) are inclinedly defined in the periphery of the rotating base (30) and communicate with the cavity (34). A horizontal adjusting screw (36) is screwed through each respective inclined thread hole (35) and each has a free end extending into the cavity (34). A securing shaft (29) is received in the central hole (31) in the rotating base (30) and has a bottom thread extending (291) into the cavity (34). A head (292) of the securing shaft (29) is received in the neck (33) in the rotating base (30).

The conical base (40) has a central threaded hole (41) to screw with the bottom thread (291) on the securing shaft (29), such that the conical base (40) is securely attached to the bottom of the securing shaft (29). The conical base (40) has a conical surface (not numbered) formed on the top of the conical base (40). The conical surface of the conical base (40) is partly accommodated in the conical cavity (34) in the rotating base (30), and a gap is defined between the conical surface and the inner surface of the conical cavity (34). The free ends of the horizontal adjusting screws (36) abut the conical surface of the conical base (40), such that the conical base (40) can be securely held relative to the rotating base. In addition, the horizontal level of the conical base (40) can be adjusted by means of turning the horizontal adjusting screws (36).

A recess (42) is defined in the bottom of the conical base (40) to receive an insulation pad (not shown). The conical base (40) has two threaded holes (43) defined in a face defining the recess (42), and the insulation pad has two through holes aligning with the threaded holes (43) in the conical base (40).

The electrode base (50) is securely attached to the bottom of the conical base (40) and has a top abutting the insulation pad. Two through holes (52) are defined in the electrode base (50) and align with the threaded hole (43) in the conical base (40). A bolt (not shown) extends through each respective through hole (52) in the electrode base (50) and is screwed into the corresponding one of the threaded holes (43) in the conical base (40), such that the electrode base (50) is securely attached to the conical base (40). A notch (51) is defined in one side of the electrode base (50).

The electrode collar (60) is securely attached around the electrode base (50) with securing bolts (62). A threaded hole (61) is defined in the collar (60) and faces the notch (51) in the electrode base (50). A securing screw (62) is screwed through the threaded hole (61) and extends into the notch (51) in the electrode base (50). Accordingly, a tool clamping device with a tool (not shown) can be securely attached to the electrode base (50) by the securing screw (62). Because the notch (51) is defined in a side of the electrode base (50), the location of the tool is eccentric relative to the main shaft (25).

With reference to FIGS. 2 to 6, a tool (70) is penetrated through the elongated opening (16) in the top base (10) and is extended into one of the holes (22) in the securing collar (20), the securing collar (20) is then rotated and moves along the inner thread (13) in the central hole (11). Accordingly, the conical inner surface of the central hole in the securing collar (20) will push the conical outer surface of the positioning sleeve (23), such that the inner surface of the central hole in the positioning sleeve (23) will tightly abut against the main shaft (25). Thus, the adjusting base (26) can be held in place relative to the top base (10). In the meantime, the middle base (28), the rotating base (30), the conical base (40), the electrode base (50), the electrode collar (60) and the tool clamping device with a tool will be positioned relative to the top base (10). Consequently, the tool on the tool clamping device can form a recess, a hole or the like in a surface of a workpiece by means of the electric discharge between the tool and the workpiece.

When the user wants to form another structure to the work at different point along a circle, with reference to FIGS. 4 to 7, the users inserts a tool (70) from the opening in the top base (10) into the corresponding one of the holes (22) in the securing collar (20). When the securing collar (20) is rotated, the securing collar (20) will move relative to the top base (10) to leave from a position where the inner conical surface of the central hole of the securing collar (20) tightly abuts against the outer conical surface of the positioning sleeve (23). Accordingly, the securing effect provided by the positioning sleeve (23) to the main shaft (25) is released, and the adjusting base (26) with the main shaft (25) can rotate relative to the top base (10). Because the tool is eccentric to the main shaft (25), the position of the tool can be moved to another point along a circle by means of rotating the adjusting base (26). After securing the main shaft (25), the tool can be quickly positioned at the desired position. Because the horizontal level of the top base (10) and the rotating base (30) will not be changed during the rotation of the rotating base (30), the horizontal level of the tool will also not be changed so that the tool can be directly worked on the workpiece. The position of the tool can be adjusted in a large range conveniently, quickly and precisely, and the use and adjustment of the tool holder are convenient.

Figure 9:
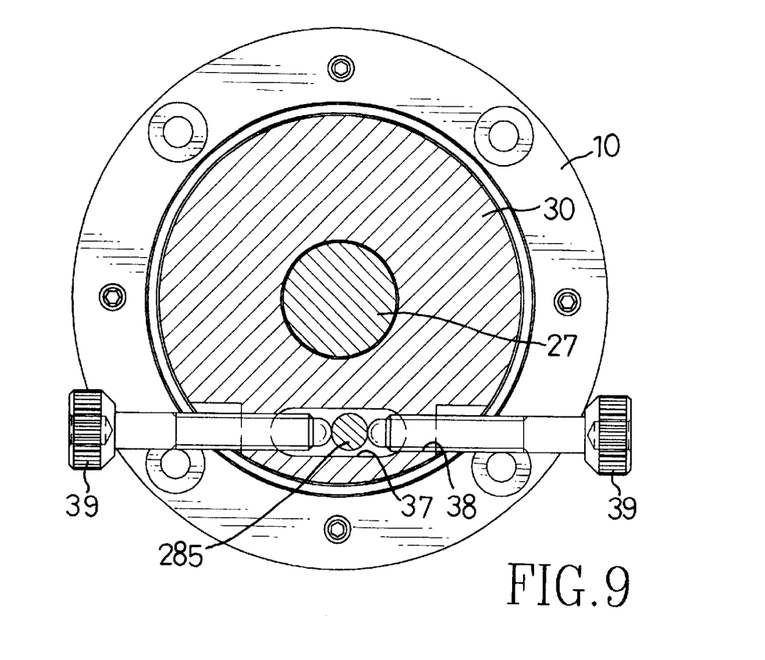
FIG. 9 is an operational bottom plan view in partial section of the tool holder in FIG. 8 showing that the position of rotating base is slightly adjusted relative to the top base by means of rotating the adjusting screws.

With reference to FIGS. 8 and 9, when one of the adjusting screws (39) is rotated to leave from a position where the free end of the adjusting screw (39) abuts against the positioning post (285) on the middle base (28), the locked effect provided by the adjusting screws (39) to the positioning post (285) on middle base (28) is released. Accordingly, the rotating base (3 0) with the tool can be rotated relative to the middle base (28) to a position where the positioning post (285) abuts the adjusting screw (39). After rotating the other adjusting screw (39) to abut the positioning post (285), the rotating base (30) can be firmly positioned again so that the position of the tool can be slightly adjusted to a precise desired position.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A tool holder for an electric discharge machine comprising:
    a top base adapted to be secured to a base of the electric discharge machine and having a central hole defined through the top base and an elongated opening laterally defined in a periphery of the top base and communicating with the central hole in the top base;
    a securing collar screwed into the central hole in the top base and having a central hole with a conical inner surface and multiple holes defined around a periphery of the securing collar and corresponding to the elongated opening in the top base;
    a positioning sleeve received in the central hole of the securing collar and having a conical outer surface fitting with the conical inner surface of the central hole in the securing collar, a central hole with a constant diameter and at least one slit longitudinally defined in the positioning sleeve to provide a resiliency to the positioning sleeve;
    an adjusting base rotatably attached to a bottom of the top base and having a main shaft extending upward from a top of the adjusting base and penetrating through the central hole in the positioning sleeve and rotatably received in the central hole in the top base;
    a rotating base adjustably connected to a bottom of the adjusting base;
    a conical base adjustably attached to a bottom of the rotating base;
    an electrode base securely attached to a bottom of the rotating base and having a notch defined in one side of the electrode base; and
    an electrode collar mounted around the electrode base and adapted to eccentrically secure a tool to the electrode base.

2. The tool holder as claimed in claim 1 further comprising a middle base securely attached to a bottom of the adjusting base for the rotating base to be adjustingly attached to a bottom of the middle base.

3. The tool holder as claimed in claim 2, wherein the adjusting base has multiple through holes defined in the adjusting base and at least one positioning stub extending downward from the bottom of the adjusting base;

the middle base has a threaded hole aligning with each respective through hole in the adjusting base and a bore corresponding to each respective at least one positioning stub for the corresponding positioning stub extending into the bore; and a screw extends through each respective through hole in the adjusting base and is screwed into the corresponding threaded hole in the middle base to secure the middle base to the adjusting base.

4. The tool holder as claimed in claim 3, wherein the adjusting base has a bottom recess defined in the bottom of the adjusting base to receive the middle base.

5. The tool holder as claimed in claim 2, wherein the middle base has a central hole defined through the middle base, a top recess defined in a top of the middle base and around the central hole and a bottom recess defined in the bottom of the middle base and around the central hole;

a positioning post extends downward from the bottom of the middle base;

a bearing is attached to the bottom of the middle base and has a top received in the bottom recess in the middle base;

a rocking shaft penetrates through the central hole and the bearing and has a head received in the top recess in the middle base and a thread formed on a bottom of the rocking shaft;

the rotating base has a central hole defined in the rotating base, an inner threaded portion defined in an inner surface of the central hole in the rotating base to screw with the thread on the rocking shaft and a recess defined in a top of the rotating base and around the central hole to receive a bottom of the bearing;

a slot is defined in the top of the rotating base for the positioning post on the middle base extending into the slot;

two horizontal threaded holes are laterally defined in the rotating base respectively at two sides of the slot and communicate with the slot; and two adjusting screws are respectively screwed into the horizontal threaded holes and each has a free end abutting one side of the positioning post extending into the slot.

6. The tool holder as claimed in claim 5, wherein the rotating base has a conical cavity defined in the bottom of the rotating base and communicates with the central hole in the rotating base;

the conical base has a conical surface formed on a top of the conical base and partly accommodated in the conical cavity in the rotating base, and a gap defined between the conical surface and the inner surface of the conical cavity;

multiple inclined threaded-holes are inclinedly defined in the periphery of the rotating base and communicate with the conical cavity; and a horizontal adjusting screw is screwed through each respective inclined threaded hole and each horizontal adjusting screw has a free end extending into the cavity and abutting the conical surface of the conical base.

7. The tool holder as claimed in claim 6, wherein the rotating base has a neck with a diameter smaller than that of the central hole in the rotating base is defined between the central hole and the conical cavity;

a securing shaft is received in the central hole in the rotating base and has a head received in the neck in the rotating base and a bottom thread extending into the cavity in the rotating base; and the conical base has a central threaded hole to threadedly engage with the bottom thread on the securing shaft.

8. The tool holder as claimed in claim 7, wherein the conical base has a recess defined in the bottom of the conical base; and an insulation pad is received in the recess in the conical base and is mounted between the conical base and the electrode base.

9. The tool holder as claimed in claim 8, wherein the conical base has two threaded holes defined in a face defining the recess;

the insulation pad has two through-holes aligning with the threaded holes in the conical base;

the electrode base has two through holes defined in the electrode base and aligning with the threaded holes in the conical base; and a bolt extends through each respective through hole in the electrode base and is screwed into the corresponding one of the threaded holes in the conical base so as to secure the electrode base to the conical base.

10. The tool holder as claimed in claim 1, wherein the top base has an inner thread defined in a bottom of the central hole in the top base to screw with a thread formed on a periphery of a bottom of the securing collar;

a flange is radially formed on an inner surface of the central hole in the top base to form a shoulder on a top of the flange;

the main shaft has a thread formed on a periphery of a top of the main shaft;

a cap is received in a top of the central hole in the top base and has an inner thread to threadingly engage with the thread on the main shaft; and multiple balls are mounted on the shoulder and support the cap to serve as a ball bearing to the cap.

11. The tool holder as claimed in claim 10, wherein the top base has a recess defined in a bottom of the top base and communicating with the central hole in the top base;

a bearing for the main shaft penetrating therethrough attached to the bottom of the top base and has a top received in the recess in the top base; and the adjusting base has a top recess defined in the top of the adjusting base and around the main shaft to receive a bottom of the bearing.

12. The tool holder as claimed in claim 1, wherein the top base has multiple first through holes defined through the top base and arranged in a circle at a center point of the central hole;

a screw penetrates through each respective first through hole and adapted to be screwed into a threaded hole in the base of the electric discharge machine;

the top base further has multiple second threaded holes with inner threads defined through the top base and arranged in a circle at a center point of the central hole;

a pad is received in each respective second threaded hole; and a pushing screw is screwed into the inner thread of each respective second threaded hole and has a top end abutting the corresponding pad.

* * * * *